United States Patent [19]
Gauger et al.

[11] Patent Number: 5,964,441
[45] Date of Patent: Oct. 12, 1999

[54] LINKAGE ASSEMBLY WITH EXTRUDED HOLE MEMBER

[75] Inventors: Derek K. Gauger, Ann Arbor; Joseph J. Grajewski, Jackson, both of Mich.

[73] Assignee: Lear Corporation, Southfield, Mich.

[21] Appl. No.: 08/625,936

[22] Filed: Apr. 1, 1996

[51] Int. Cl.⁶ ............................. A47C 1/022; F16M 13/00
[52] U.S. Cl. ........................................... 248/429; 248/421
[58] Field of Search ..................... 248/429, 421, 248/419, 394; 403/263, 261, 271, 270; 297/344.12, 344.15, 344.17; 296/205, 29; 228/49.3

[56] References Cited

U.S. PATENT DOCUMENTS

| | | |
|---|---|---|
| 1,703,037 | 2/1929 | Hick . |
| 1,840,724 | 1/1932 | Koehring . |
| 2,237,535 | 4/1941 | Wahl . |
| 2,837,930 | 6/1958 | Desmond ............................. 248/419 X |
| 2,865,428 | 12/1958 | Williams ................................. 248/419 |
| 2,892,483 | 6/1959 | Rose ..................................... 248/419 X |
| 3,012,317 | 12/1961 | Wolfe . |
| 3,112,564 | 12/1963 | Murray . |
| 3,388,211 | 6/1968 | Nichols et al. . |
| 3,822,464 | 7/1974 | Hester et al. ............................. 29/460 |
| 3,823,464 | 7/1974 | Chartet . |
| 3,919,756 | 11/1975 | Kajrup . |
| 4,015,812 | 4/1977 | Heesch .................................... 248/394 |
| 4,026,456 | 5/1977 | Lema ....................................... 228/136 |
| 4,326,117 | 4/1982 | Kanne, Jr. et al. ......................... 219/85 |
| 4,342,373 | 8/1982 | Erickson et al. .......................... 181/266 |
| 4,432,583 | 2/1984 | Russo et al. .............................. 297/330 |
| 4,679,723 | 7/1987 | Veit et al. ................................. 228/168 |
| 4,777,708 | 10/1988 | Harwood et al. ........................... 29/157 |
| 5,112,018 | 5/1992 | Wahls ...................................... 248/394 |
| 5,224,749 | 7/1993 | Gauger et al. ........................... 296/65.1 |
| 5,316,258 | 5/1994 | Gauger et al. ............................ 248/548 |
| 5,333,918 | 8/1994 | Crout et al. .............................. 285/286 |
| 5,483,853 | 1/1996 | Moradell et al. .................... 248/419 X |
| 5,501,422 | 3/1996 | Chinomi ................................. 248/419 |

*Primary Examiner*—Leslie A. Braun
*Assistant Examiner*—Stephen S. Wentsler
*Attorney, Agent, or Firm*—MacMillan, Sobanski and Todd, LLC

[57] ABSTRACT

A linkage assembly for use with kinetic mechanisms such as an automotive seat assembly having an elongated torsion rod made of either a solid bar or a hollow cylindrical tube, and at least one linkage member having an aperture corresponding to the cross-sectional profile of the torsion rod and adapted to receive the torsion rod therethrough. The linkage member includes an essentially flat sheet of metal extending from and coplanar to the aperture and an outwardly extending extruded metal flange which projects upward from the flat surface of the linkage member. The extruded flange defines a sleeve through which the torsion member extends. A weld seam is located at the terminal end of the flange in attaching contact between the torsion rod and the flange to form a secure union between the two members.

15 Claims, 3 Drawing Sheets

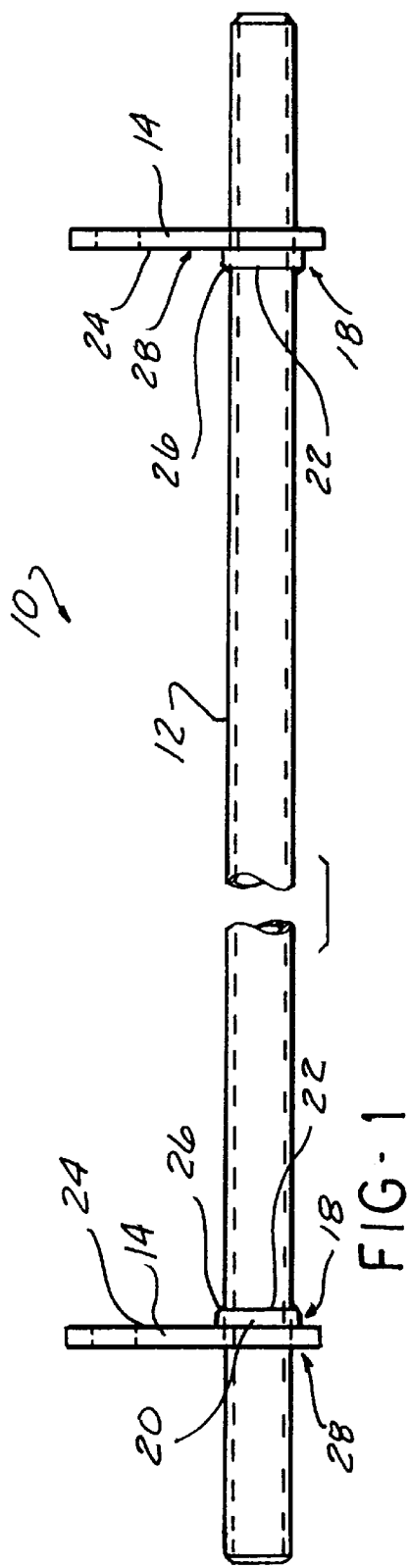
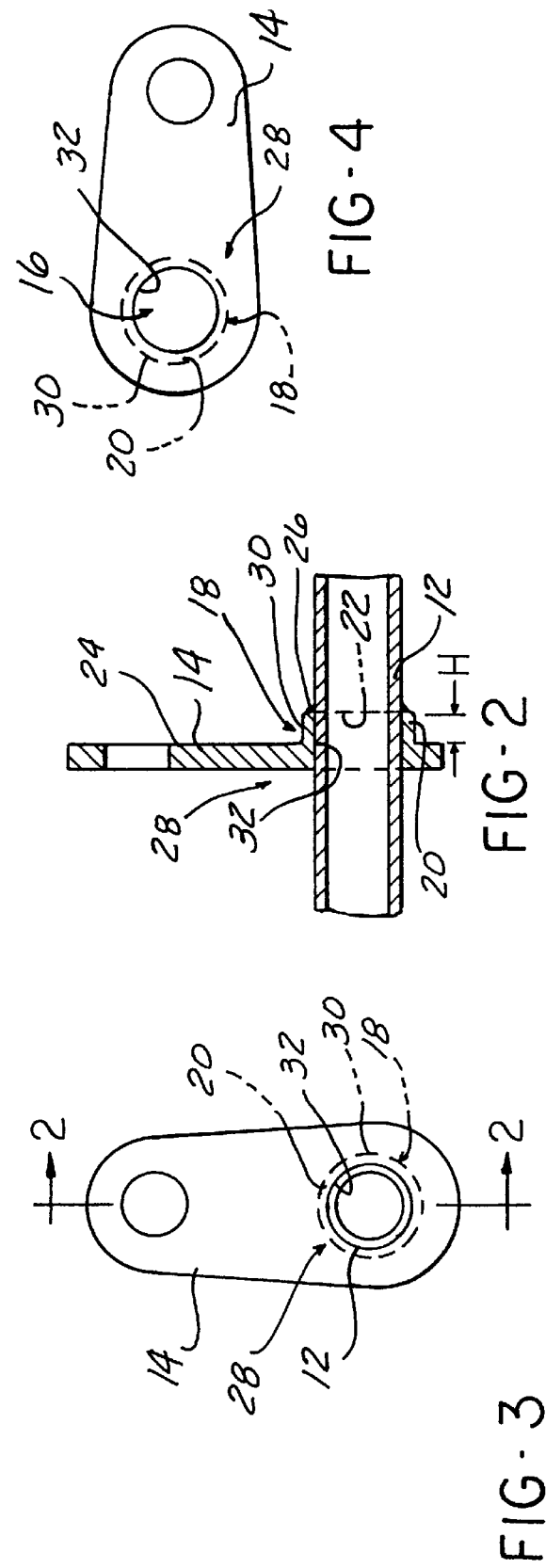

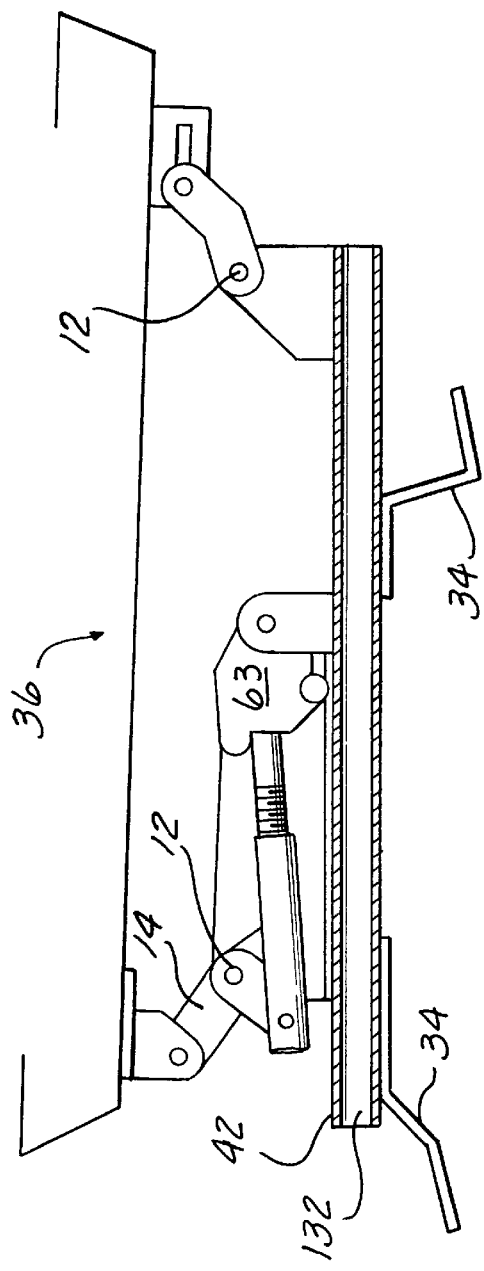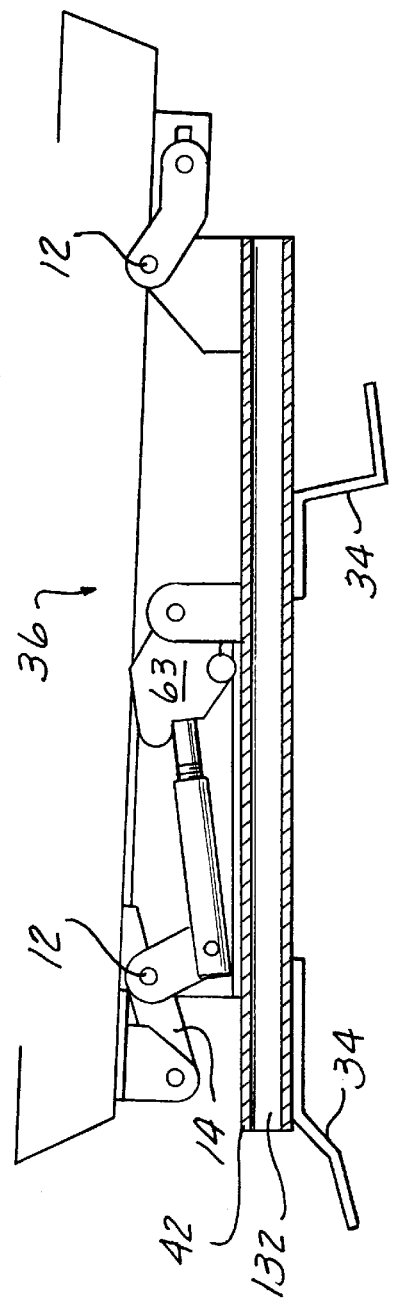

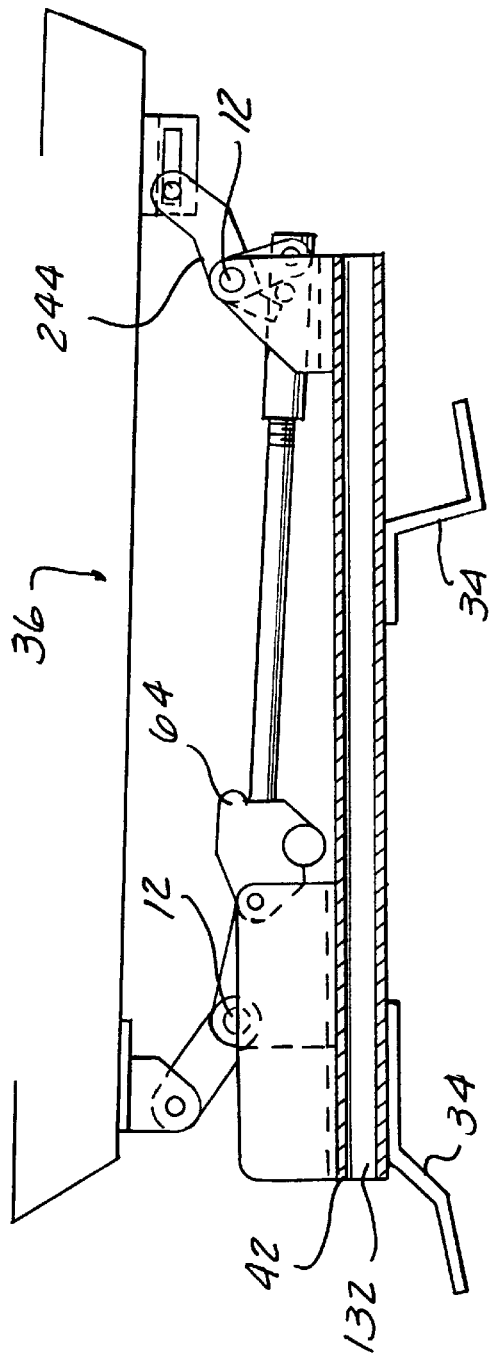
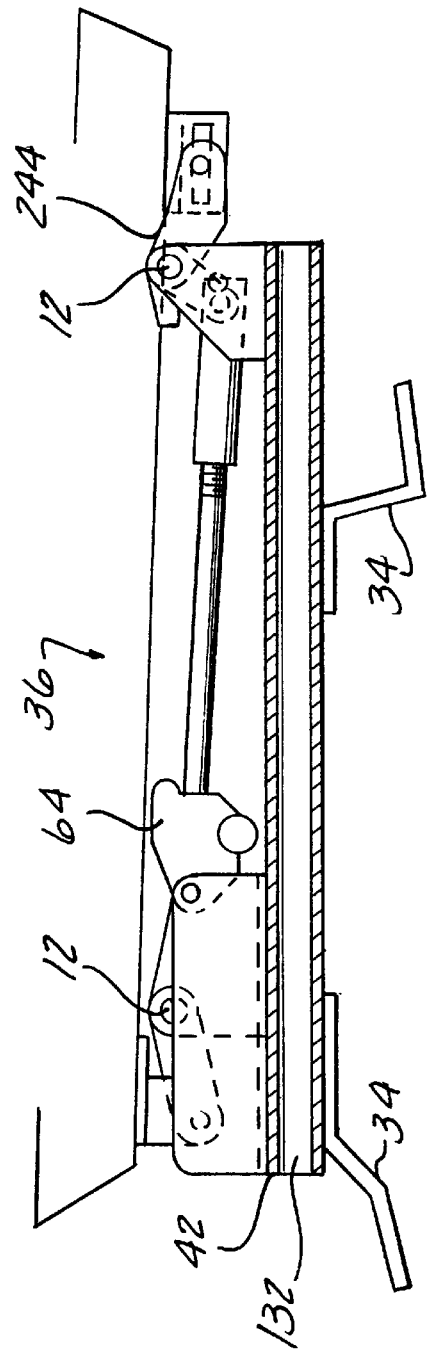

LINKAGE ASSEMBLY WITH EXTRUDED HOLE MEMBER

BACKGROUND OF THE INVENTION

1. Field of the Invention

This invention pertains to self-fixturing weldments and attachment mechanisms for use with bars, rods and the like for use in mechanisms such as seat guides and the like; particularly employed in automotive vehicles.

2. Brief Discussion of the Relevant Art

In linkage assemblies such as those employed in seat assembly units, torsion rod sub-assemblies can be employed to accommodate the desired movement of the seat assembly. Heretofore, the torsion rod sub-assembly was composed of an elongated member such as a bar or tube onto which perpendicularly projecting linkage members could be attached. The linkage members are composed of a metal member having an aperture positioned in a suitably flat region through which the cylindrical bar or tube can be inserted. The linkage member is welded to the elongated member at a position relative thereon. In order to achieve a successful welding operation, the weld must flow into the tight corner formed between the torsion rod and the flat surface of the linkage. This creates a less than ideal weld condition as it is difficult to flow the weld material evenly between the mating parts. This creates a potential for voids in the "corner" between the two members and can result in insecure welds on either or both of the respective surfaces.

Additionally, welding a linkage assembly of the described configuration presents a situation in which the linkage material proximate to the weld joint is more massive than the torsion tube which is being attached. When either element, i.e. the link or the torsion tube/bar, is more massive than the other, the heat of the welding operation flows unevenly toward the more massive element. This can create an uneven weld. In order to compensate for this phenomenon, additional welding heat is sometimes applied. In such situations, it is theoretically possible to burn through the less massive element resulting in undesirable part failure.

Additionally, in the assembly of mechanisms, such as linkage assemblies, it is necessary that the linkage member be positioned precisely relative to the torsion rod. Positioning of the linkage member must be both longitudinally and angularly precise relative to the torsion rod. It has been found that conventional linkage members were difficult to fixture and position during the welding process to provide the necessary angular precision relative to the torsion bar/link. The linkages had tended to "toe in" or "toe out". Imprecise positioning during the welding process can result in rejected parts if great care and precision is not taken during the assembly procedure.

Thus, it would be highly desirable to provide a linkage assembly in which the component parts are such that the disparity in mass between the linkage member and the torsion rod is eliminated or greatly reduced. Additionally, it would be desirable to provide a linkage assembly in which the various components are configured to permit greater ease in fixturing the parts relative to one another during the manufacturing process. It would be highly desirable to provide a linkage assembly which would permit secure weld seams and greater reproducability and repeatability in the welding process during manufacturing. Finally, it would be desirable to provide an automotive seat device employing such a linkage assembly.

SUMMARY OF THE INVENTION

The present invention is an improved linkage assembly for use with an automotive seat assembly or other kinetic mechanisms including an elongated torsion member made of either a: solid bar or a hollow cylindrical tube. The torsion member has an outer cross-sectional profile, and at least one linkage member having an aperture corresponding to the cross-sectional profile of the torsion member and adapted to receive the torsion member therethrough. The linkage member includes an essentially flat sheet of metal extending outward from and coplanar to the aperture. The aperture is further defined by an extruded metal flange extending continuously upward from the flat surface of the linkage member and terminating at a position thereabove. The extruded flange defines a sleeve through which the torsion member extends to form the improved linkage assembly. A weld seam is located at the terminal end of the sleeve, in contact between the terminal end of the sleeve and the outer surface of the torsion member to form a secure union between the two members.

BRIEF DESCRIPTION OF THE DRAWINGS

The description herein makes reference to the accompanying drawings wherein like reference numerals refer to like parts throughout the several views, and wherein:

FIG. 1 is a linkage assembly having a torsion bar and the modified drive link subassembly;

FIG. 2 is a cross-sectional view taken along the line 2—2 as shown in FIG. 3;

FIG. 3 is a top side view of the linkage members as employed in FIG. 1;

FIG. 4 is a bottom side view of the linkage member employed in FIG. 1.

FIG. 5 is a cross sectional view showing a seat mechanism with a front elevating structure in a full up position;

FIG. 6 is a cross sectional view a seat mechanism with the front elevating structure in a full down position;

FIG. 7 is a cross sectional view of a seat mechanism with a rear elevating structure in a full up position; and FIG. 8 is a cross sectional view of a seat mechanism with the rear elevating structure in a full down position.

DESCRIPTION OF THE PREFERRED EMBODIMENT

In the present invention, the linkage assembly 10 is composed of a torsion member 12 and at least one linkage member 14. The torsion member 12 can be formed from either a solid stock bar or a cylindrical tubular stock as shown in FIG. 2. The torsion member 12 may be of any suitable length or configuration for use in the finished drive link assembly. The torsion member 12 may have any cross sectional configuration desired. However, for ease of manufacturing and subsequent assembly of the drive linkage 10, the preferred cross-sectional profile is circular.

The linkage assembly 10 may have any number of linkage members 14 necessary to perform desired functions in the larger mechanism of which the linkage assembly is a part. As shown in FIG. 1, the drive link assembly 10 has two linkage members 14 positioned at predetermined locations on the torsion member 12.

The linkage member 14 is, preferably, a suitable configured element having a flat planar surface region with an aperture 16 defined therein adapted to matingly receive torsion member 12 therethrough. The linkage member aperture 16 is defined by an upwardly projecting flange member 18 contiguously formed with the flat planar surface of linkage member 14. In addition to the flat planar surface region having aperture 16 defined therein, the linkage member 14 may have any suitable protrusions, extensions, bosses, apertures etc. necessary for attachment to other related mechanisms in the larger assembly.

In the preferred embodiment, the aperture 16 defined by upwardly projecting flange member 18 has an inner diameter of essentially uniform size adapted to receive torsion member 12 in a secure telescoping relationship. The upwardly projecting flange member 18 is defined by a continuous central wall 20 terminating in an upper terminal surface 22 located distal to the flat planar region of the linkage member 14. The continuous central wall 20 of flange 18 can have any suitable height H defined as the distance between the upper surface 24 of the flat planar region of link member 14 and the terminal surface 22 of flange member 18. In the embodiment shown in FIG. 2, the height H is greater than or equal to the thickness of the flat planar region of the link member 14. However, height H of flange member 18 can vary depending upon other design parameters such as the internal diameter of the aperture 16, etc.

The terminal surface 22 of flange member 18 may have any suitable surface geometry provided that the configuration of the terminal surface of flange member 18 is amenable to welding processes.

The central wall 20 of upwardly projecting flange member 18 can have any suitable wall thickness. Preferably, the wall thickness of flange member 18 is one which is either essentially equal to or less than the corresponding wall thickness of any tube stock employed as torsion member 12. In the preferred embodiment, the central wall 20 of flange 18 has a wall thickness between about 2 mm and about 7 mm; with a thickness between about 3 mm and about 5 mm being preferred.

The upwardly projecting flange member 18 is, preferably, contiguously formed with the flat planar portion of linkage member 14. The junction point between the upper surface 24 of linkage member 14 and the central wall 20 of flange 18 may be defined by any suitable radius. A radius of 1.5 minimum is preferred, however, sharper or more gradual radii can be employed. As shown in the drawing Figures, the flange 18 extends perpendicularly outward from the flat planar region of the linkage member 14. In this manner, the ability to accurately position linkage member 14 perpendicular to the torsion bar 12 is increased. It is also within the purview of this invention to provide for a flange 18 which projects from the flat planar region of linkage member 14 at an angle other than perpendicular in the event that non-perpendicular positioning of the linkage member 14 relative to torsion bar 12 is desired.

As depicted in FIG. 1, the linkage assembly 10 of the present invention includes two linkage members 14 in spaced relationship on torsion rod 12. The respective linkage members 14 may be positioned with flange members 18 in facing relationship as shown in FIG. 1 or may be positioned so that the flange members 18 are positioned in serial relationship in which all flange members are oriented unidirectionally on the torsion rod 12 or in outwardly facing relationship (both not shown) depending the stresses to which the drive link assembly is to be subjected.

The linkage assembly 10 of the present invention also includes a weld seam 26 in mating contact with the terminal surface 22 of the flange member 18 and the exterior surface of torsion member 12 proximate to the flange member 18. If desired, the weld seam 26 can form a bead extending continuously around the entire terminal surface 22 in the manner shown in FIG. 2. It is also within the purview of this invention to provide a series of discreet weld points (not shown) positioned around the radius of the flange as well as to provide a partial weld. As used herein, the term "partial weld" is defined as any continuous weld of less than 360°. Additionally, it is within the purview of this invention to provide a weld region which extends over the exterior surface of the central wall 20 of flange 18 to envelope all or part of the flange member. In such circumstances, the weld seam 26 can extend from a point above the terminal surface 22 of flange member 18 to a location on the upper surface of linkage member 14 or any lesser amount. The weld seam can be applied by any suitable process such as MIG welding, TIG welding, interrupted welds or the like.

The resulting linkage assembly 10 of the present invention provide for a more secure weldment between the torsion rod member and the linkage member elements. Additionally, the flange member 18 provide a self-fixturing mechanism whereby the linkage member 14 is maintained in an appropriate angular orientation relative to torsion member 12.

The linkage member 14 of the present invention can be manufactured by any suitable method to provide the integral flange member 18. Such methods include, but are not limited to, metal stamping, casting, cold forming and the like.

The present invention also includes a process for the manufacture of drive link assembly such as those describe herein. In the process of the present invention, suitable linkage member 14 having an aperture 16 with an internal diameter defined by upwardly projecting flange member 18 is positioned on torsion rod 12. A suitable weld seam 26 is applied at the junction between the terminal surface 22 of upwardly projecting flange member 18 and the outer surface of torsion rod 12 located proximate to the linkage member 14. During application of the weld seam, the flange member 18 acts in concert with the linkage member to provide self-fixturing of the linkage member 14 relative to the torsion rod 12. The weld seam is applied at a location away from the general surface of the linkage member 14 this provides means whereby the mass of the torsion rod 12 is more equal to the mass of the central wall 20 of the flange 18 thereby more closely equalizing the heat necessary to achieve optimal welding. The weld seam 26 can be applied by any suitable mechanism such as TIG, MIG or interrupted seam welding processes in a continuous, partial or intermittent manner. Upon completion of the welding operation, the linkage assembly can be employed in mechanisms such as seat assemblies or the like in automobiles and other suitable device.

The linkage assembly 10 of the present invention can be successfully employed with automotive seat track assembly devices as a subassembly mechanism used in achieving functions such as isolated elevation of the front or rear of an associated automotive seat. In such instances it is anticipated that a torsion bar configured with the linkage assembly 10 of the present invention would be mounted to a suitable assembly such as a seat carriage with at least one associated linkage member secured to an element such as a seat support bracket such that rotation of the respective torsion bar and an associated linkage member connected to suitable means to achieve movement and/or elevation of seat support bracket and the associated seat.

Suitable seat mechanisms in which the linkage assembly 10 of the present invention can be incorporated include those having mechanisms to facilitate horizontal forward and/or rearward movement of a seat in a motor vehicle by any suitable movement means such as a motor or hand or foot actuated devices. Suitable seat mechanisms in which the linkage assembly 10 of the present invention can be incorporated also include those mechanisms which can accomplish elevation of the front or rear end of the associated seat.

These devices can include laterally spaced-apart first and second rail members 132 stationarily secured to the vehicle 34, as best seen in FIGS. 5–8. A moving carriage 36 comprised of a track member 42 is engaged with each rail member 132 to constrain the carriage 36 to forward and rearward horizontal movement. The seat track mechanism can also include means for elevating the automotive seat such as front elevating structure 63 operated by the elevating means for elevating the front end of the seat and rear elevating structure 64 operated by said elevating means for elevating the rear end of the seat. The elevation of the front and rear end of the seat can occur substantially independently. A pivotal link 14 at the front end of the seat generally interfaces between the front elevating structure and the seat. This link has a pivotal mounting to the carriage and to a section affixed to the seat, and is moveable about its carriage mounting on operation of the front end of the seat. A second link 244 is located at the rear end of the seat with one section of the second link affixed to the carriage and a second section spaced from the section coupled to the rear end of the seat through a suitable connection to enable limited rearward movement of the seat. A torsion rod 12 of the linkage assembly of the present invention is affixed to a linkage member at the respective seat end thereof. The linkage member has a flat body portion and a flange member extending outward therefrom with the flange member having an outer central surface, an opposed inner surface and a terminal surface distal to the flat body portion 28 extending between the outer central surface 30 and the opposed inner surface 32 and the flange member defining an aperture extending through the linkage. The torsion rod extends through the aperture such that the outer surface of the torsion rod and the inner surface of the flange are in parallel facing relationship, and a weld seam is integrally attached to the terminal surface of the flange member and the outer surface of the torsion rod proximate thereto.

Examples of seat mechanisms in which the drive link assembly 10 of the present invention may be employed include those described in U.S. Pat. No. 4,432,583 to Russo et al.; U.S. Pat. No. 5,112,018 to Wahls; U.S. Pat. Nos. 5,224,749 and 5,316,258 both to Gauger et al; and U.S. Pat. No. 4,015,812 to Heesch, the specifications of which are incorporated by reference herein.

What is claimed is:

1. A linkage assembly for use in kinetic mechanisms such as an automotive seat assembly, comprising:
   at least one linkage member, the linkage member having a flat body region and a flange member extending outward therefrom, the flange member having a continuous wall with an outer peripheral surface, an opposed inner surface and a terminal surface distal to the flat body region extending between the outer peripheral surface and the opposed inner surface, the outwardly extending flange member defining an aperture extending through the flange member and the flat body region;
   an elongated torsion member having an outer surface, the elongated torsion member extending through the aperture of the linkage member such that the outer surface of the torsion member and the inner surface of the flange are in parallel facing relationship; and
   a weld seam, integrally attached to the flange member and the outer surface of the elongated torsion member proximate thereto.

2. The linkage assembly of claim 1 wherein the elongated torsion member is a cylindrical tube having a first wall thickness and the continuous wall of the elongated flange member has a second wall thickness, wherein the second wall thickness is between about 50% and about 150% of the first wall thickness.

3. The linkage assembly of claim 2 wherein the flat body region of the linkage member has a third wall thickness greater than the first wall thickness of the cylindrical tube and second wall thicknesses of the continuous wall of the flange member.

4. The linkage assembly of claim 1 wherein the weld seam extends continuously around the terminal surface of the flange member.

5. The linkage assembly of claim 1 wherein the weld seam is intermittently positioned around the terminal surface of the flange member.

6. The linkage assembly of claim 1 wherein the weld seam extends partially around the terminal surface of the flange member.

7. The linkage assembly of claim 1 wherein the flat body region of the linkage member has a first thickness and the flange member has a height at least as great as the thickness of the flat body region of the linkage member.

8. The linkage assembly of claim 7 wherein the continuous wall of the flange member has a thickness less than the thickness of the flat body region and the weld seam has a thickness essentially equal to the wall thickness of the continuous wall.

9. In a seat track mechanism for horizontally moving the seat of a motor vehicle in a forward and rearward sense and for elevating the front end of the seat and elevating the rear end of the seat, the mechanism including laterally spaced apart first and second rail members stationary secured to the vehicle, a moving carriage having a track member engaged with each rail member for constraining the carriage to forward and rearward horizontal movement, means for elevating said seat, a front elevating structure operated by said elevating means for elevating the front end of the seat substantially independently of elevation of the rear end of the seat, a rear elevating structure operated by said elevating means for elevating the rear end of the seat substantially independently of any operation of the front elevating structure, a pivotal link at the front end of the seat interfacing between the front elevating structure and the seat, said link having a pivotal mounting to said carriage and to a section affixed to said seat, said link moveable with respect to said pivotal mounting on operation of the front end of the seat, and a second link at the rear end of the seat with one section of the second link affixed to the carriage and a second section spaced from said one section coupled to the rear end of the seat through a suitable connection to enable said limited rearward movement of the seat on elevation of the front end of the seat, and a torsion bar affixed to a linkage member at the respective seat end thereof, said linkage member comprising:
   a flat body portion and a flange member extending outward therefrom, the flange member having an outer peripheral surface, an opposed inner surface and a terminal surface distal to the flat body portion extending between the outer peripheral surface and the opposed inner surface, the flange member defining an aperture extending through the linkage member such that the outer surface of the torsion rod and the inner surface of the flange are in parallel facing relationship, and a weld seam, integrally attached to the terminal surface of the flange member and the outer surface of the torsion rod proximate thereto.

10. The seat track mechanism of claim 9 wherein the elongated torsion rod is a cylindrical tube having a first wall thickness and a peripheral wall of the elongated flange member has a second wall thickness, wherein the second wall thickness is between about 50% and about 150% of the first wall thickness.

11. The seat track mechanism of claim 9 wherein the elongated torsion member is a cylindrical tube having a first wall thickness and the flat metal body of the linkage member has a third wall thickness greater than the first thickness.

12. The seat track mechanism of claim 9 wherein the weld seam extends continuously around the terminal surface of the flange body of the linkage member.

13. The seat track mechanism of claim 9 wherein the weld seam is intermittently positioned around the terminal surface of the flange body of the linkage member.

14. The seat track mechanism of claim 9 wherein the weld seam extends partially around the terminal surface of the flange body of the linkage member.

15. The seat track mechanism of claim 9 wherein the linkage member has a first thickness and the flange member has a height at least as great as the thickness of the flat metal body of the linkage member.

* * * * *